US009137015B2

(12) United States Patent
Jin et al.

(10) Patent No.: US 9,137,015 B2
(45) Date of Patent: Sep. 15, 2015

(54) PROTECTION SCHEME FOR AACS KEYS

(75) Inventors: Chao Jin, Hangzhou (CN); Weitao Sun, Hangzhou (CN)

(73) Assignee: ArcSoft, Inc., Fremont, CA (US)

( * ) Notice: Subject to any disclaimer, the term of this patent is extended or adjusted under 35 U.S.C. 154(b) by 1606 days.

(21) Appl. No.: 11/969,687

(22) Filed: Jan. 4, 2008

(65) Prior Publication Data
US 2010/0020968 A1   Jan. 28, 2010

(51) Int. Cl.
*G06F 15/16* (2006.01)
*H04L 9/08* (2006.01)
*H04N 5/913* (2006.01)
*H04N 21/258* (2011.01)
*H04N 21/8355* (2011.01)
*H04L 9/14* (2006.01)
*H04N 5/765* (2006.01)
*H04N 5/85* (2006.01)

(52) U.S. Cl.
CPC ............... *H04L 9/0891* (2013.01); *H04L 9/14* (2013.01); *H04N 5/913* (2013.01); *H04N 21/2585* (2013.01); *H04N 21/8355* (2013.01); H04L 2209/603 (2013.01); *H04N 5/765* (2013.01); *H04N 5/85* (2013.01); *H04N 2005/91364* (2013.01)

(58) Field of Classification Search
CPC ......... H04N 5/765; H04N 5/85; H04N 5/913; H04N 21/2585; H04N 21/8355; H04N 2005/91364; H04L 9/0891; H04L 9/14; H04L 2209/603
See application file for complete search history.

(56) References Cited

U.S. PATENT DOCUMENTS

| 5,668,880 | A  | * | 9/1997  | Alajajian ...................... 370/342 |
|-----------|----|---|---------|------------------------------------------|
| 5,832,090 | A  | * | 11/1998 | Raspotnik ...................... 705/66 |
| 5,857,025 | A  | * | 1/1999  | Anderson et al. ............... 380/28 |
| 6,009,177 | A  | * | 12/1999 | Sudia ............................ 713/191 |
| 6,480,117 | B1 | * | 11/2002 | Flick ......................... 340/12.28 |
| 6,563,928 | B1 | * | 5/2003  | Vanstone et al. ............... 380/30 |
| 6,704,870 | B2 | * | 3/2004  | Vanstone et al. ............. 713/180 |
| 6,990,200 | B1 | * | 1/2006  | Kasahara et al. ............... 380/44 |
| 7,876,895 | B2 | * | 1/2011  | Jin et al. ......................... 380/37 |
| 8,023,653 | B2 | * | 9/2011  | Doherty et al. ............... 380/201 |
| 8,121,287 | B2 | * | 2/2012  | Jin et al. ......................... 380/36 |
| 2002/0152392 | A1 | * | 10/2002 | Hardy et al. ................. 713/189 |
| 2003/0086567 | A1 | * | 5/2003  | Okamoto et al. ............ 380/201 |
| 2004/0103292 | A1 | * | 5/2004  | Shirouzu ....................... 713/193 |

(Continued)

OTHER PUBLICATIONS

Nate Lawson; Anti-debugger techniques are overrated; Apr. 19, 2007; root labs rdist; 1 Page.*

(Continued)

*Primary Examiner* — Arvin Eskandarnia
*Assistant Examiner* — Anthony Fabbri
(74) *Attorney, Agent, or Firm* — Patent Law Group LLP; David C. Hsia

(57) ABSTRACT

A method for protecting a software video player having Advanced Access Content System (AACS) includes reading segments of an encrypted first key from noncontiguous regions of memory, assembling the segments to form the encrypted first key, decrypting the encrypted first key with a second key to form a first key, extracting AACS key data from a pack file, decrypting the AACS key data to retrieve AACS Device Keys, generating an AACS Title Key using the AACS Device Key, clearing the AACS Device Keys and the first key from memory after the AACS Title Key is generated, decrying encrypted AACS content with the AACS Title Key to form AACS content, and displaying the AACS content.

26 Claims, 10 Drawing Sheets

(56) References Cited

U.S. PATENT DOCUMENTS

| | | | |
|---|---|---|---|
| 2004/0123122 A1* | 6/2004 | Asai et al. | 713/189 |
| 2004/0172538 A1* | 9/2004 | Satoh et al. | 713/175 |
| 2005/0135705 A1* | 6/2005 | Nishi | 382/276 |
| 2005/0138624 A1* | 6/2005 | Morrison et al. | 718/102 |
| 2005/0195975 A1* | 9/2005 | Kawakita | 380/30 |
| 2006/0047961 A1* | 3/2006 | Hashimoto et al. | 713/173 |
| 2006/0116969 A1* | 6/2006 | Hatanaka et al. | 705/71 |
| 2006/0117013 A1* | 6/2006 | Wada | 707/9 |
| 2006/0153381 A1* | 7/2006 | Kim et al. | 380/228 |
| 2006/0188098 A1* | 8/2006 | Kumagai et al. | 380/239 |
| 2007/0201691 A1* | 8/2007 | Kumagaya | 380/30 |
| 2008/0013732 A1* | 1/2008 | Ohno | 380/277 |
| 2008/0049932 A1* | 2/2008 | Ono et al. | 380/44 |

OTHER PUBLICATIONS

Len Norton; Cracking Embird 7.11 Evaluation; Jan. 24, 2007; 5 Pages.*

Woodmann; Anti-debugging & Software Protection Advice; Dec. 31, 2006; 1 Page.*

Nagareshwar Talekar; Detecting & Defeating the Debuggers; SecurityXploded.com; Jul. 15, 2007; 1 Page.*

\* cited by examiner

PROTECTION SCHEME FOR AACS KEYS

FIELD OF INVENTION

This invention relates to apparatus and method for protecting the Advanced Access Content System (AACS) in software video players.

DESCRIPTION OF RELATED ART

The Advanced Access Content System (AACS) is a standard for content distribution and digital rights management that is intended to restrict access to and copying of High Density (HD) and Blue-ray Disk (BD) media. It was developed by AACS Licensing Administrator, LLC (AACS LA), a consortium that includes Disney, Intel, Microsoft, Matsushita (Panasonic), Warner Brothers, IBM, Toshiba, and Sony.

FIG. 1 presents a simplified view of encryption and decryption processes for pre-recorded video content provided by AACS. An owner of content that is to be protected provides the content in the form of one or more Titles to a licensed replicator. The licensed replicator selects a secret, random Title Key (Kt) for encrypting each Title. The licensed replicator also assigns a random Volume ID to the protected Title or a set of protected Titles to safeguard against "bit-by-bit copying" of protected content. The Volume ID is stored on a prerecorded medium in a manner that cannot be duplicated by consumer recorders.

For each protected Title or a set of protected Titles to be included together on the pre-recorded medium, the AACS LA provides to the licensed replicator a Media Key Block (MKB), a Sequence Key Block, and a secret Media Key (Km). The MKB will enable all compliant devices, each using their set of secret Device Keys and Sequence Keys, to calculate the same or variants of the Media Key. If a set of Device Keys is compromised in a way that threatens the integrity of the system, an updated MKB can be released that will cause a device with the compromised set of Device Keys to calculate a different Media Key than the remaining compliant devices. In this way, the compromised Device Keys are "revoked" by the new MKB.

For each protected Title, the licensed replicator calculates a cryptographic hash of the Media Key and the Volume ID, and uses the result to encrypt the Title's Title Key. The encrypted Title Key and the MKB are stored on the pre-recorded medium.

The AACS LA provides a set of 253 secret Device Keys to the licensed manufacturer for inclusion into each compliant device or application produced. Device Key sets may either be unique per licensed product, or used commonly by multiple products.

The licensed product reads the MKB from the pre-recorded medium, and uses its Device Keys to process the MKB and thereby calculate the Media Key. If the given set of Device Keys has not been revoked, then the calculated Media Key will be the same Media Key that was used by the licensed replicator as described above.

For each protected Title the licensed product then calculates a cryptographic hash of the calculated Media Key and the Volume ID, and uses the result to decrypt the Title's encrypted Title Key. The result is then used to decrypt the Title.

Playback of AACS content is only performed using the Title Keys and Volume ID which are read from the media. Except otherwise provided by the AACS specifications, the values used to enable playback of AACS content (e.g. Title Keys and Volume ID) shall be discarded upon removal of the instance of media from which they were retrieved. Any derived or intermediate cryptographic values shall also be discarded.

FIG. 2 illustrates a conventional BD software video player 200 for AACS content. Software video player 200 is typically executed by a processor in a computer or in an appliance from codes and data loaded into volatile memory. Software video player 200 includes a player engine 201 with an AACS engine 202 and AACS keys 203 acquired from AACS LA. AACS keys 203 include a Host Certificate, a set of Device Keys, and a set of Sequence Keys. Using AACS keys 203, AACS engine 202 decrypts data from an encrypted data source 204. Depending on the user input, a BDMV (Blu-ray Disk Movie) engine 206 in player engine 201 instructs AACS engine 202 to access the appropriate files on encrypted data source 204, receives the file from AACS engine 302, and forwards the appropriate data to codec engine 208 in player engine 201. Specifically, BDMV engine 206 splits the file that contains both audio and video data (and other data stream such as subtitles) and sends the appropriate data to a video codec and an audio codec (and other modules) in codec engine 208. BDMV engine 206 also controls the synchronization between the video and audio from the video and the audio codecs. Codec engine 208 decodes the data and presents the content for display. Software video player 200 may include an application layer 207 that generates the user interface for controlling player engine 201. Application layer 207 receives user controls and notifies BDMV engine 206 to respond to the user controls, such as playing a title. Application layer 207 also receives message from BDMV engine 206 to display to the user.

Hackers have found various AACS keys by using debuggers to inspect the memory space of running HD-DVD and BD software video players. Thus, what are needed are method and apparatus for safeguarding the AACS content in HD-DVD and BD software video players.

SUMMARY

In embodiments of the invention, methods are provided to protect AACS Device Keys in a software video player and to encrypt data transfers between modules of the player.

In one embodiment, AACS Device Keys and their renewal information are packed into a file and then encrypted. When the software video player starts, the encrypted file is read into memory and decrypted. If the Device Keys have expired, the software video player will prompt the user to renew the Device Keys. Otherwise the software video player uses the Device Keys to calculate AACS Title Keys for decoding encrypted content. Afterwards, the software video player clears the memory of keys by filling it with random numbers.

In one embodiment, to prevent static analysis, the Title Keys are encrypted with a random number and they are decrypted only when they are used. After they are used, the Title Keys are encrypted immediately with a new random number. In addition, junk codes are inserted into essential places of the binary machine code of the software video player. Furthermore, the binary machine code self-decrypts dynamically only at runtime.

In one embodiment, to prevent dynamic debugging, a monitoring mechanism in the system service is provided to detect debugging tools and determine whether or not the software video player is under conditions that indicate the player is being debugged.

In one embodiment, authentication is used between certain modules of the player and encryption is used in data transfer between certain modules of the player.

BRIEF DESCRIPTION OF THE DRAWINGS

Use of the same reference numbers in different figures indicates similar or identical elements.

DETAILED DESCRIPTION OF THE INVENTION

Figure 1:
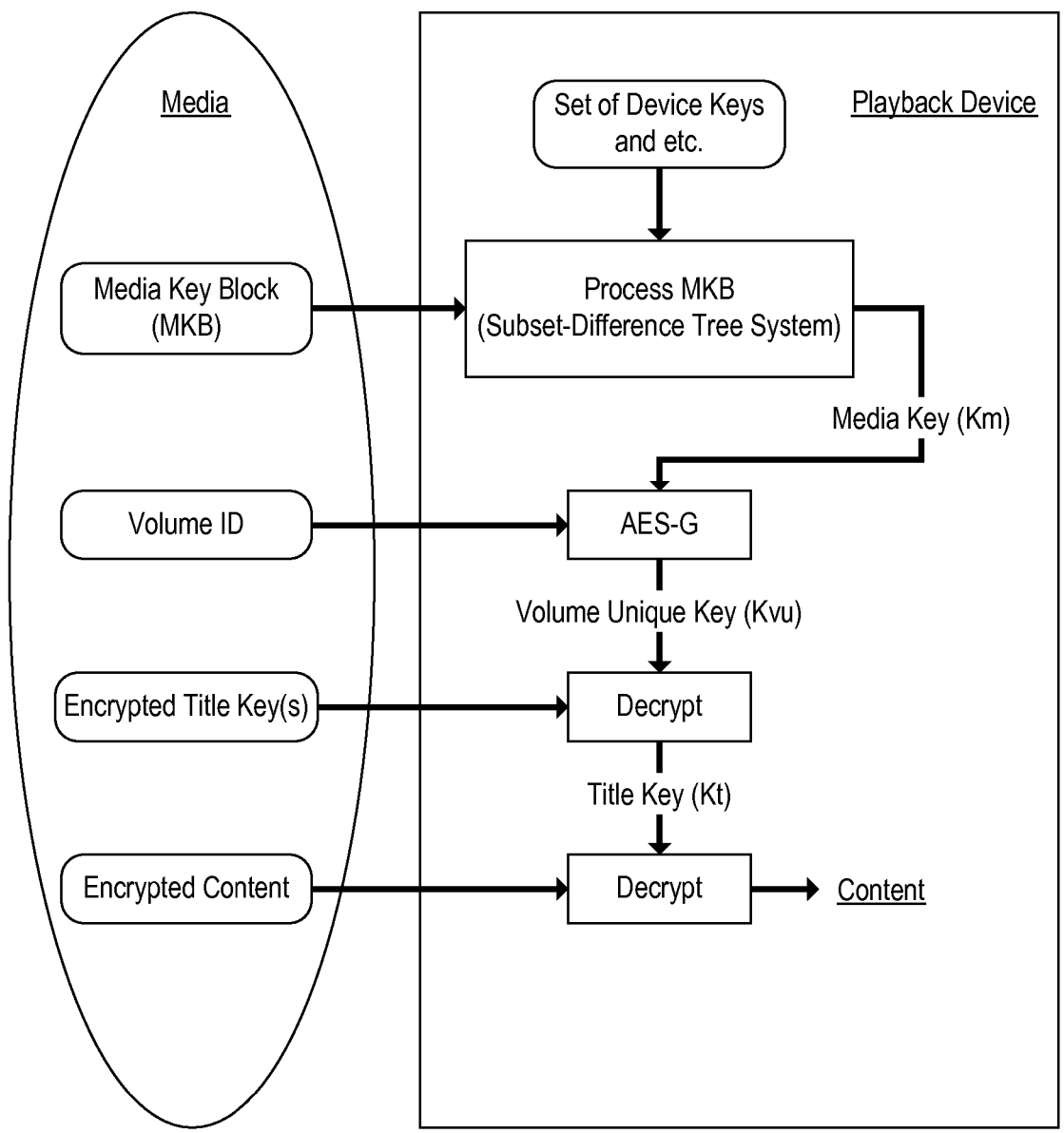
FIG. 1 illustrates a simplified view of the AACS system.
Figure 2:
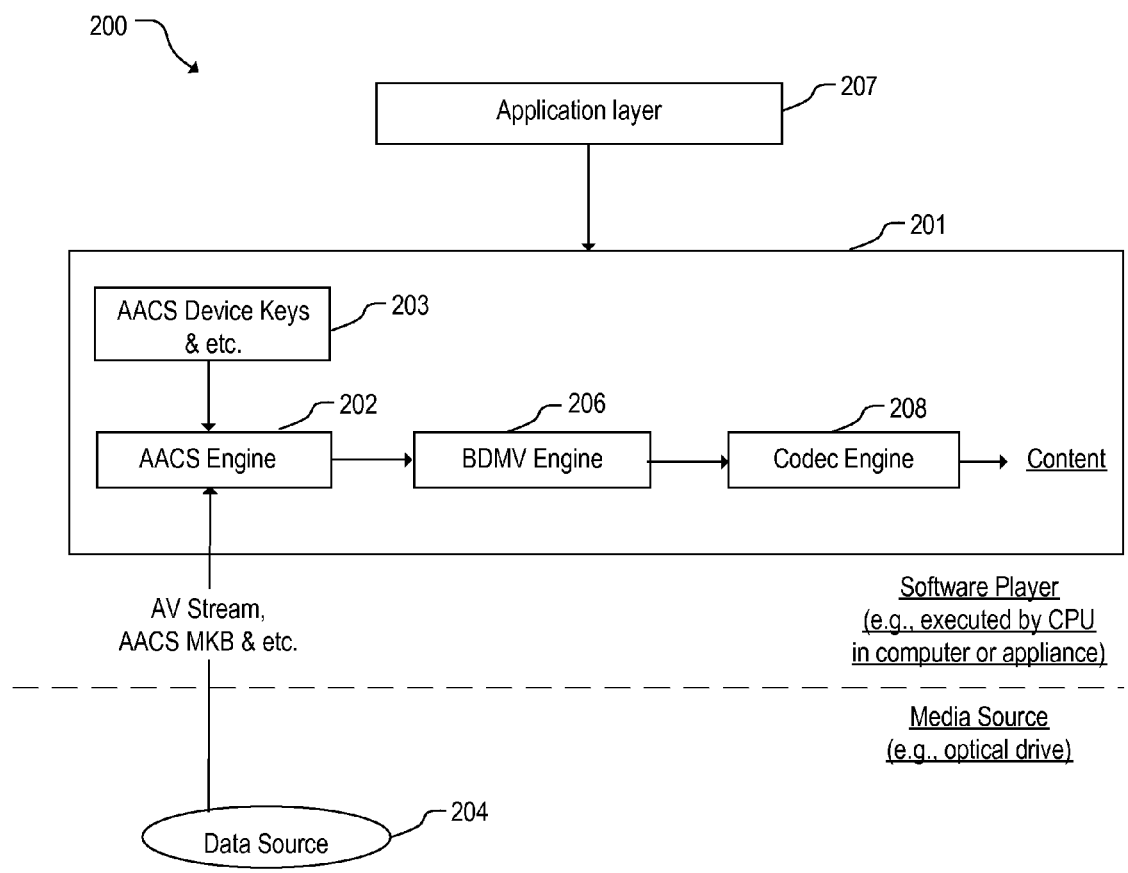
FIG. 2 illustrates a conventional software video player implemented with AACS.

Conventional software video player 200 of FIG. 2 has certain disadvantages against hacking. First, AACS keys 203 are normally encoded into individual binary files for carrying out renewal. These binary files can be detected and analyzed to determine AACS keys 203. Second, AACS keys 203 are not encrypted so they can be obtained by comparative analysis through memory dump. Even if they were encrypted, a hacker can use a debugging tool to find AACS keys 203 and use other tools to decrypt them. Third, when the modules of software video player 200 are implemented as filters with Microsoft DirectShow software development kit (SDK), data transfers between the modules are not protected.

In embodiments of the invention, software video player is provided with (1) encryption of the AACS keys, (2) countermeasures against static analysis, (3) countermeasures against debugging tools, (4) authentication between modules of the player, and (5) encryption of data transfer between modules of the player.

Figure 3:
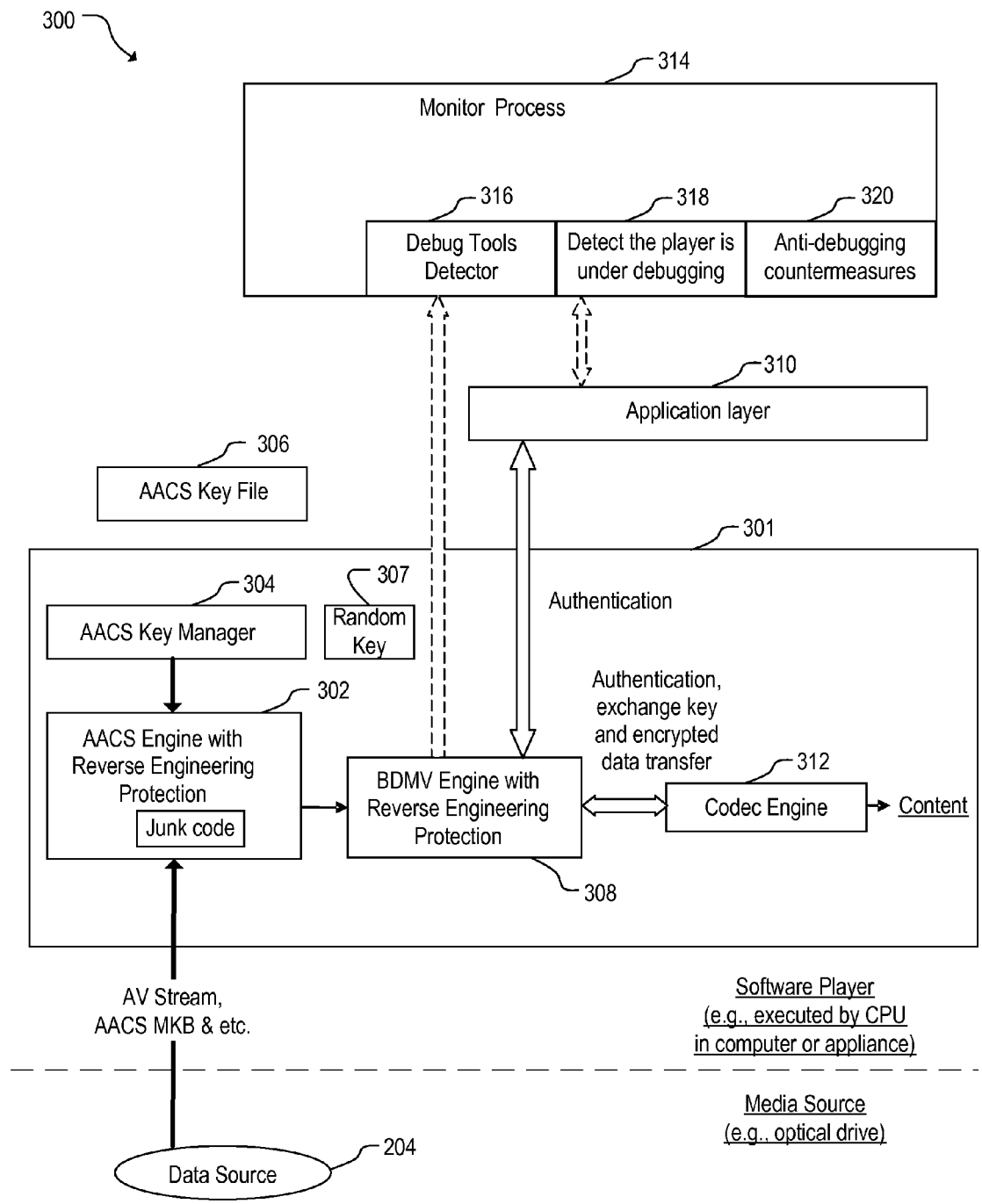
FIG. 3 illustrates a software video player implemented with additional safeguards for the AACS system in one embodiment of the invention.

FIG. 3 illustrates a software video player 300 in one embodiment of the invention. To overcome the shortcomings of the conventional video player, software video player 300 includes the five features described above to strengthen the protection provided by the AACS.

Software video player 300 is typically executed by a processor in a computer or in an appliance from codes and data loaded in volatile memory. Software video player 300 includes a player engine 301 with an AACS engine 302. AACS engine 302 has hacking countermeasures so it does not directly access AACS keys. Instead, AACS engine 302 requests the AACS keys from an AACS key manager 304 only when the AACS keys are needed. In response, AACS key manager 304 decrypts an AACS key file 306 and provides the AACS keys to AACS engine 302.

Figure 4:
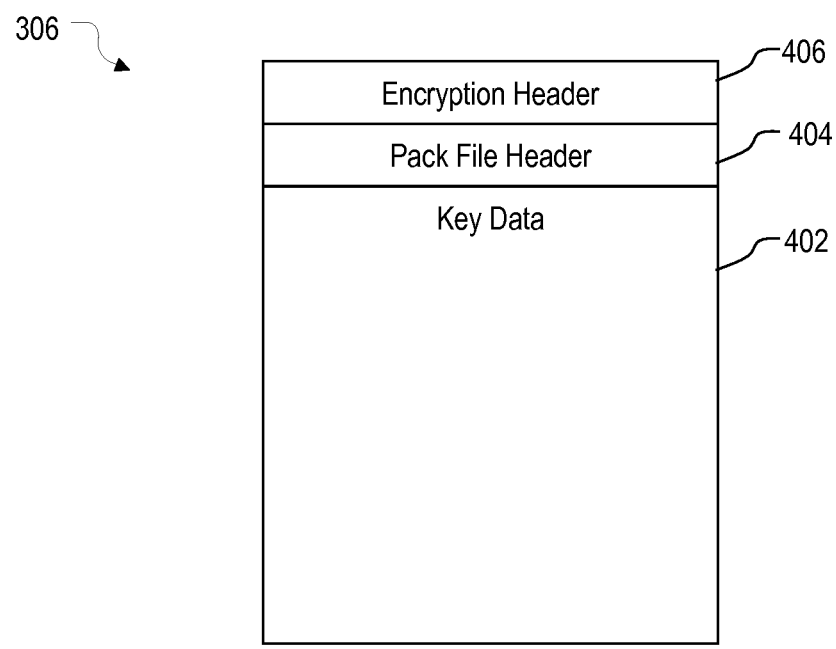
FIG. 4 illustrates an encrypted pack file format of AACS key data in one embodiment of the invention.

FIG. 4 illustrates the format of AACS key file 306. AACS key file 306 includes AACS key data 402, a pack file header 404, and an encryption header 406. AACS key data 402 includes a Host Certificate, a set of Device Keys, and a set of Sequence Keys provided by AACS LA. Pack file header 404 includes the version of the pack file tool, the names of the source files, the creation date of the pack file, and the expiration date of AACS keys provided by AACS LA. Encryption header 406 includes information about the pack file itself, such as file size, the data offset, and so on.

The contents of AACS key file 306 is packed and then encrypted by a Pack Tool using a random key 307 (FIG. 3). The pack tool can use an encryption algorithm, such as AES. AACS key manager 304 manages random key 307 for AACS key file 306, uses random key 307 to decrypt AACS key file 306, retrieves AACS key data 402 from decrypted AACS key file 306, and provides AACS key data 402 to AACS engine 302. More importantly, AACS key manager 304 prevents hackers from finding AACS key data 402 through a memory dump. Using a memory dump, a hacker takes several static images of memory of an algorithm under different states and then finds the sensitive information by comparing the static images. To prevent such a memory dump, AACS key manager 304 uses several methods including (1) encrypting random key 307 in the memory with a temporary random key that changes frequently, (2) separating the encrypted random key 307 into several segment stored in noncontiguous memory, (3) creating the necessary AACS keys only when they are used, and (4) clearing the memory by filling the memory with random data after using the AACS keys.

Figure 5:
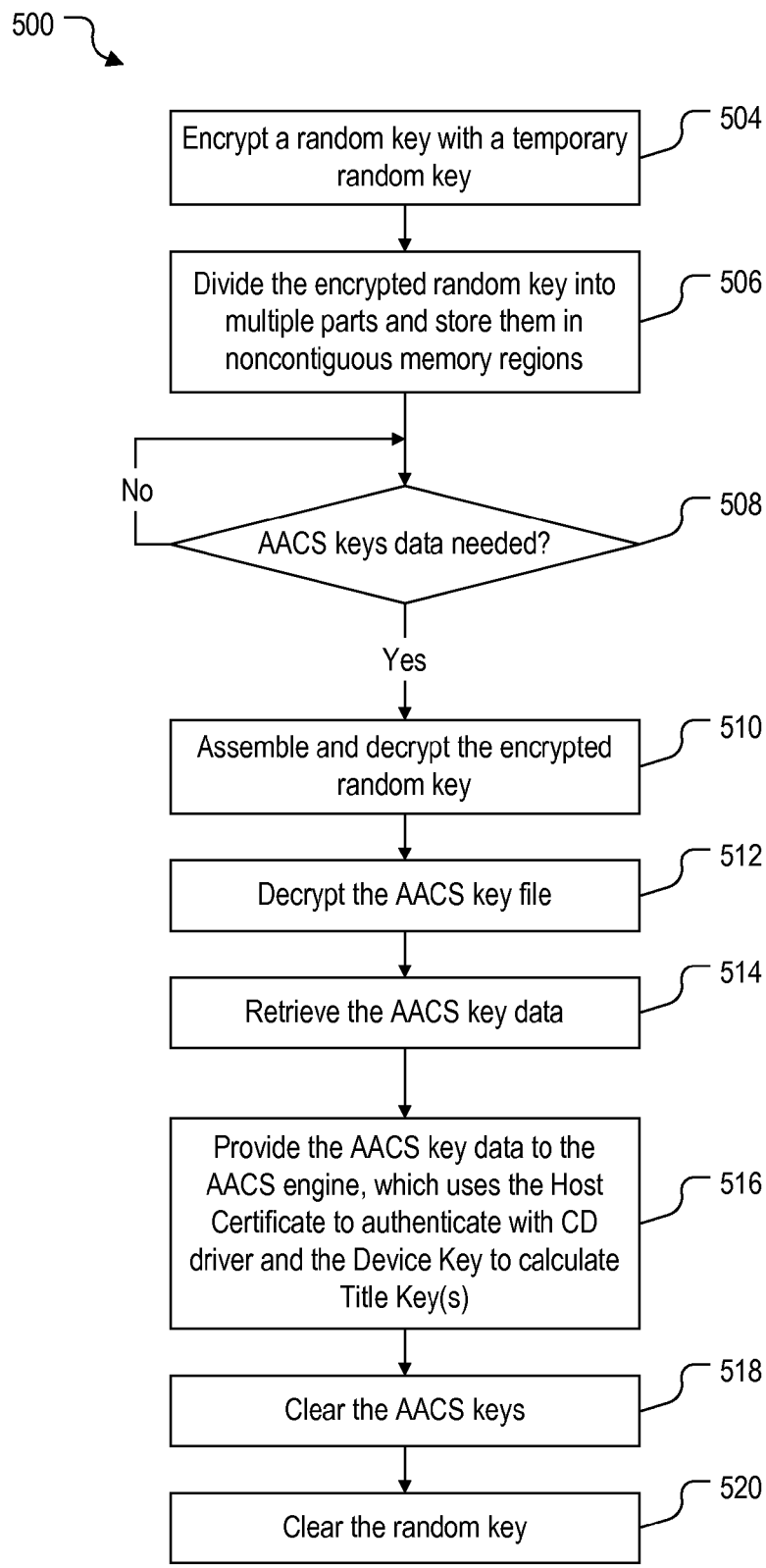
FIG. 5 is a flowchart of a method for an AACS key manager in the software video player of FIG. 3 in one embodiment of the invention.

FIG. 5 is a flowchart of a method 500 performed by AACS key manager 304 in one embodiment of the invention.

In step 504, AACS key manager 304 encrypts or masks random key 307 with a temporary random key to prevent random key 307 from appearing directly in the memory during long playbacks. In one embodiment, AACS key manager 304 encrypts random key 307 by XORing it with the temporary random key. AACS key manager 304 creates a new temporary random key each time software video player 300 is started. Step 504 is followed by step 506.

In step 506, AACS key manager 304 divides the encrypted random key 307 into multiple segments and stores them in noncontiguous memory regions. For example, AACS key manager 304 allocates different buffers through the operating system to store the segments. This again prevents random key 307 from appearing directly in the memory. Step 506 is followed by step 508.

In step 508, AACS key manager 304 determines if AACS engine 302 is requesting AACS key data 402. If so, then step 508 is followed by step 510. Otherwise step 508 loops until AACS engine 302 requests AACS key data 402.

In step 510, AACS key manager 304 assembles the segments of the key 307 and decrypts encrypted random key 307 with the temporary random key.

In step 512, AACS key manager 304 decrypts AACS key file 306 with random key 307. Step 512 is followed by step 514. In one embodiment, AACS key manager 304 reads the pack file header 404 to make sure the AACS keys have not expired. If the AACS keys have expired, AACS key manager 304 will prompt for the newest AACS keys. The newest AACS keys may be downloaded through the Internet or read from a disc.

In step 514, AACS key manager 304 retrieves AACS key data 402 from the decrypted AACS key file 306. Step 514 is followed by step 516.

In step 516, AACS key manager 304 provides AACS key data 402 to AACS engine 302. In response, AACS engine 302 uses the Host Certificate to authenticate the optical drive, and the Device Keys and the Sequence Keys to calculate Title Key(s). As only the Title Key(s) are used for decrypting the media when the player is running, AACS key data 402 and random key 307 can be deleted after the Title Key(s) are determined. To prevent static analysis, the Title Keys(s) may be encrypted with a random number and decrypted only when they are used. After they are used, the Title Keys may be encrypted immediately with a new random number. Step 516 is followed by step 518.

In step 518, AACS key manager 304 clears AACS key data 402 from the memory by filling their memory locations with random numbers. Step 518 is followed by step 520.

In step 520, AACS key manager 304 clears random key 307 from the memory by filling its memory location with random numbers.

Figure 6:
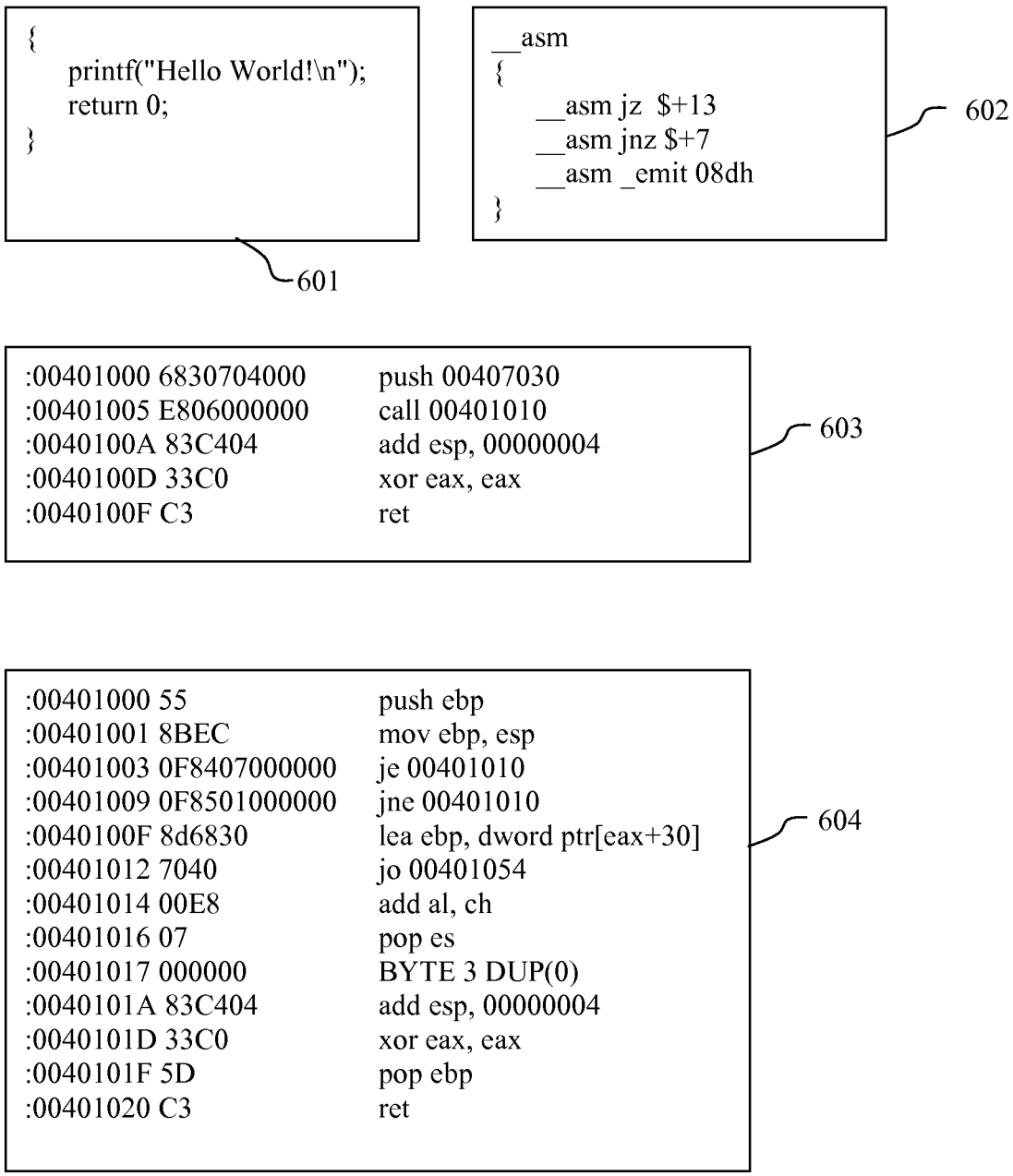
FIG. 6 illustrates the use of junk code in the source code in one embodiment of the invention.

Referring back to FIG. 3, AACS engine 302 also includes junk code as a countermeasure against static analysis. Specifically the junk code is inserted into the source code of AACS engine 302 and then compiled into binary machine code. The strategic placement of the junk code in critical character strings and function transfers in the compiled binary machine code, such as those for the AES, makes them more difficult to decipher. FIG. 6 illustrates assembly code 603 disassembled by a disassembler program (e.g., W32Dasm) from the binary machine code compiled from source code 601. FIG. 6 also illustrates an assembly code 604 disassembled from the binary machine code compiled from code 601 after junk code 602 is inserted. As FIG. 6 shows, the disassembled code is changed by the junk code and is very difficult to decipher.

AACS engine 302 further uses self-extraction as a countermeasure against static analysis. The binary code of AACS engine 302 is compressed and encrypted into a file by a development tool before release, and the file self-extracts dynamically at runtime. The binary code of AACS engine 302 can be encrypted by XORing the code with a predefined random number.

Referring back to FIG. 3, a BDMV engine 308 in player engine 301 instructs AACS engine 302 to access the appropriate data on encrypted data source 204, receives the data from AACS engine 302, and forwards the data to a codec engine 312 in player engine 201. In one embodiment of the invention, the modules of software video player 300 are implemented as filters with Microsoft DirectShow SDK. In one embodiment, AACS engine 302 and BDMV engine 308 are implemented in a single filter.

Figure 7:
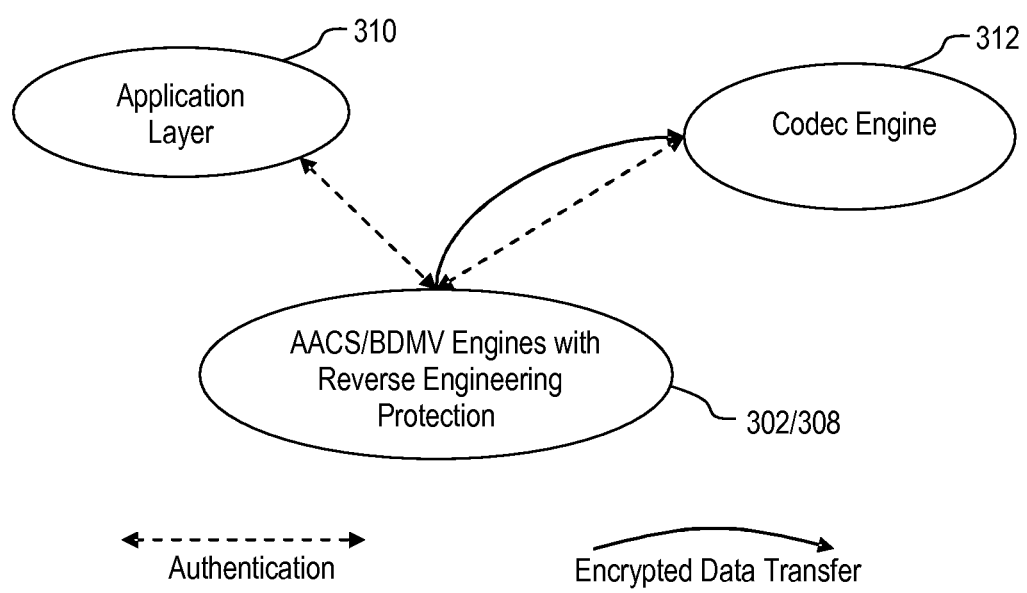
FIG. 7 illustrates authentication and encrypted data transfer between modules in one embodiment of the invention.

Conventionally filters do not authenticate each other before data transfer and data transfer between filters are not protected. This provides opportunities for a hacker to exploit the filters if the hacker forges an empty filter that accepts decrypted data and dumps the data to a file. Therefore, software video player 300 is provided with authentication between certain modules and data encryption in the data transfer between certain modules in one embodiment of the invention. As illustrated in FIGS. 3 and 7, authentication is provided between BDMV engine 308 and application layer 310, and between BDMV engine 308 and codec engine 312. Furthermore, data encryption is provided to data transfer between BDMV engine 308 and codec engine 312.

Figure 8:
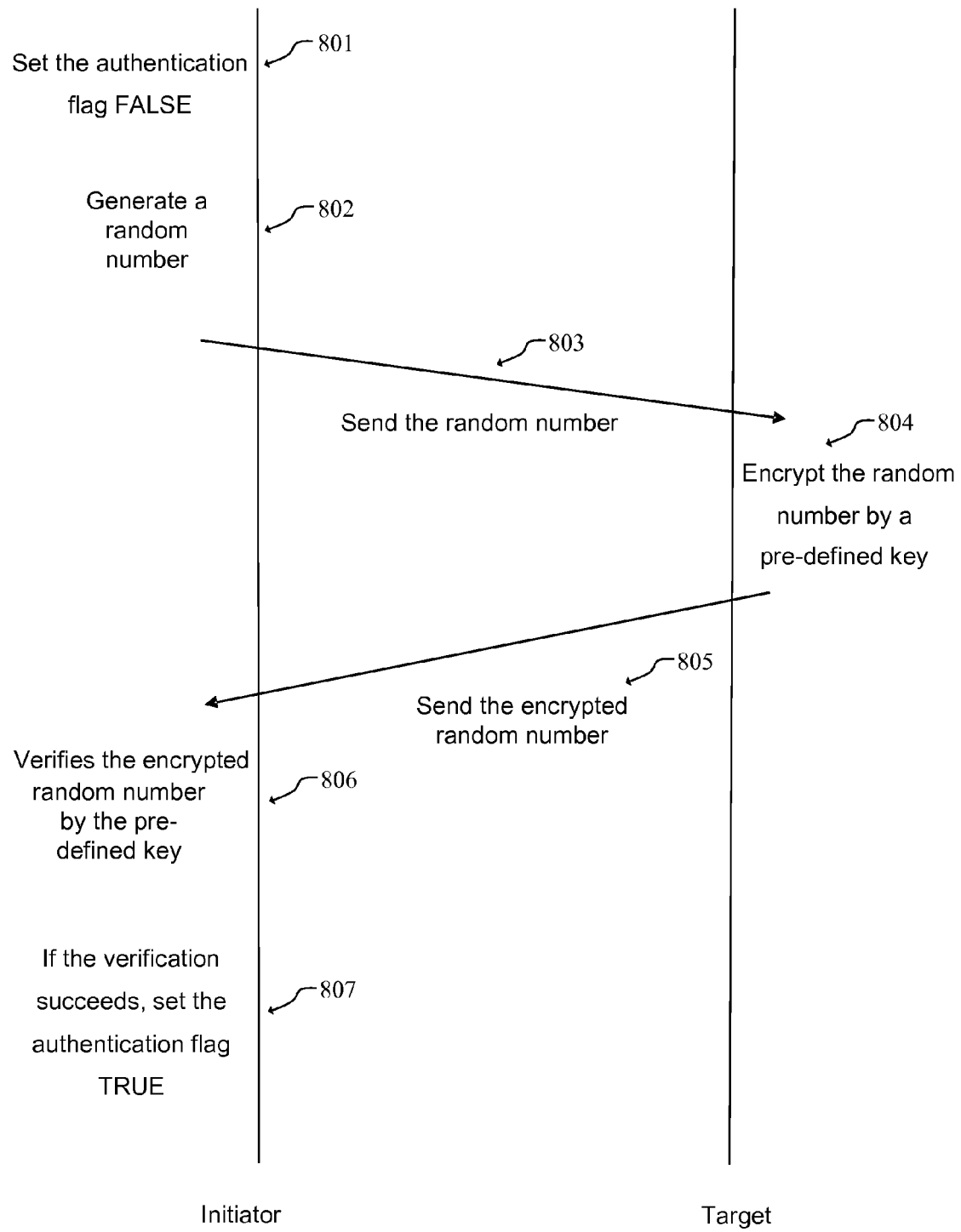
FIG. 8 illustrates authentication between modules in one embodiment of the invention.

FIG. 8 illustrates an authentication process 800 between a module that initiates the authentication (hereafter "initiator") and a module that is the target of the authentication (hereafter "target") in one embodiment of the invention. For example, BDMV engine 308 can be the initiator and one of application layer 310 and codec engine 312 can be the target. Authentication is performed each time the modules connect.

In step 801, the initiator sets an authentication flag for the target to FALSE, which indicates that the target has not been authenticated. Step 801 is followed by step 802.

In step 802, the initiator generates a random number (e.g., a 16 byte). Step 802 is followed by step 803.

In step 803, the initiator sends the random number to the target. Step 803 is followed by step 804.

In step 804, the target encrypts the random number with its copy of a predefined key. Both the initiator and the target have the predefined key in their source codes. Step 804 is followed by step 805.

In step 805, the target sends the encrypted random number to the initiator. Step 805 is followed by step 806.

In step 806, the initiator verifies the encrypted random number by decrypting it with its copy of the predefined key. If the decrypted result matches the random number the initiator sent to the target, then the target is authenticated. Step 806 is followed by step 807.

In step 807, the initiator sets the authentication flag to TRUE if the decrypted result matches the random number sent to the target. Otherwise the initiator leaves the authentication flag as FALSE.

Figure 9:
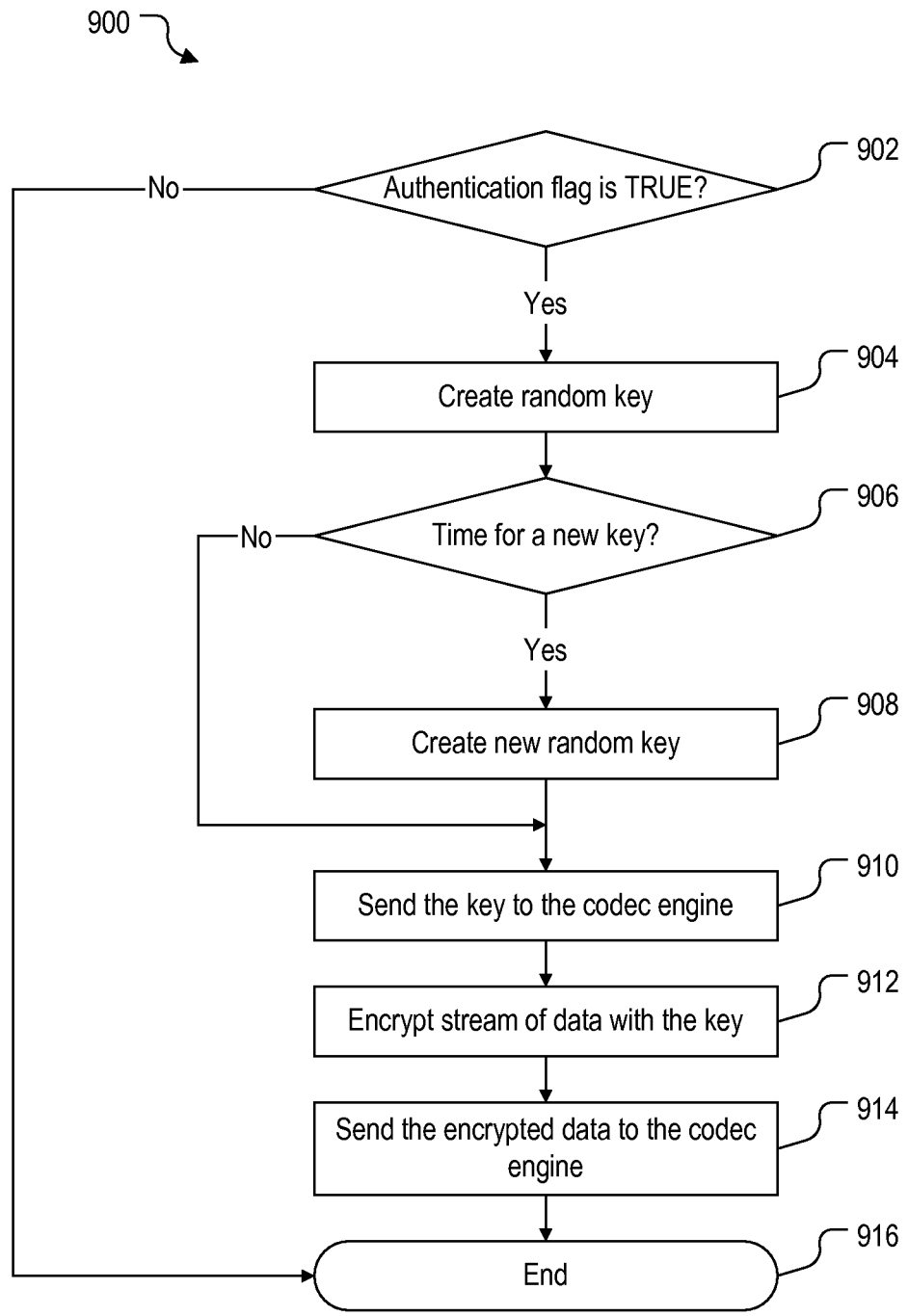
FIG. 9 is a flowchart of a data encryption process between modules in one embodiment of the invention.

FIG. 9 is a flowchart of a method 900 for BDMV engine 308 to forward data to codec engine 312 in an encrypted data transfer in one embodiment of the invention.

In step 902, BDMV engine 308 determines if the authentication flag for codec engine 306 is TRUE. If so, codec engine 312 has been previously authenticated in process 800 (FIG. 8) and step 902 is followed by step 904. Otherwise step 902 is followed by step 916, which ends method 900.

In step 904, BDMV engine 308 creates a random number (e.g., 16 byte) as a key. Step 904 is followed by step 906.

In step 906, BDMV engine 308 determines if a certain amount of time has passed since the key was created so it is time for generate a new key. If so, then step 906 is followed by step 908. Otherwise step 906 is followed by step 910.

In step 908, BDMV engine 308 generates a new random number as a key. Step 908 is followed by step 910.

In step 910, BDMV engine 308 sends the key to codec engine 312 by a function call. Step 910 is followed by step 912.

In step 912, BDMV engine 308 encrypts a stream of data with the key. In one embodiment, BDMV engine encrypts the data by XORing them with the key. Step 912 is followed by step 914.

In step 914, BDMV engine 308 sends the encrypted data to codec engine 312. In response, codec engine 312 uses the key received in step 910 to decrypt the data and otherwise process the data for display. Step 914 is followed by step 916, which ends method 900.

Referring back to FIG. 3, software video player 300 includes a monitor process 314 in one embodiment of the invention. Monitor process 314 is a system service that starts running when the operating system is booted. If monitor process 314 detects whether software video player 300 is running a fixed time period after the software video player is started. If so, monitor process 314 starts an anti-debugging process.

Figure 10:
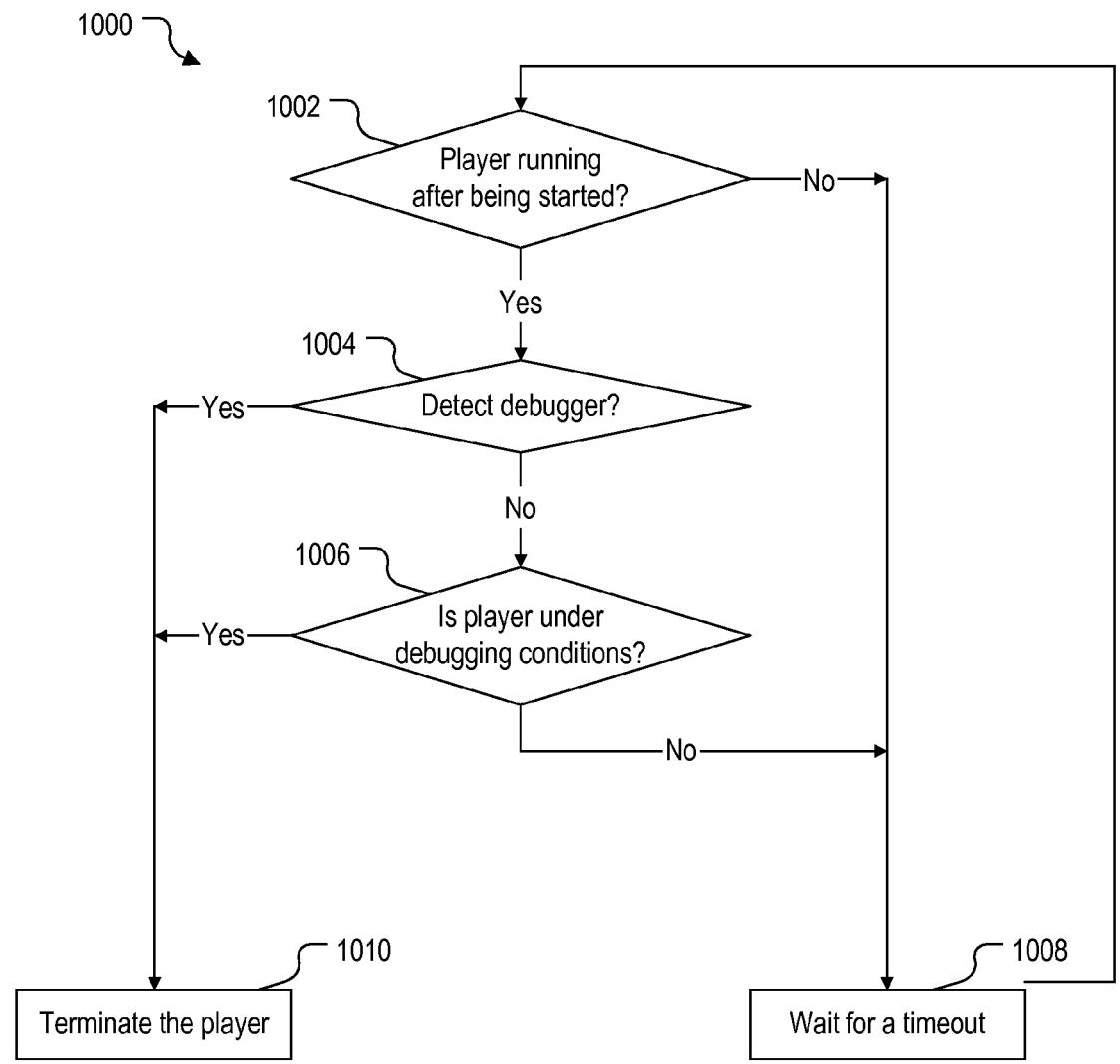
FIG. 10 is a flowchart of a debugging monitoring process in one embodiment of the invention.

FIG. 10 is a flowchart of a method 1000 for monitor process 314 in one embodiment of the invention.

In step 1002, monitor process 314 determines if software video player 300 is running after the software video player was started. If so, then step 1002 is followed by step 1004. Otherwise step 1002 is followed by step 1008.

In step 1004, monitor process 314 determines if a debugging tool is running. This function is represented by reference numeral 316 (FIG. 3) in monitor process 314. Monitor process 314 has means to detect common debugging tools that are specific to each tool. If monitor process 314 detects a debugging tool, then step 1004 is followed by step 1010. Otherwise step 1004 is followed by step 1006.

In one embodiment for the Win32 system, a check server is provided to prevent debugging. In the Win32 system, there is a thread information block (TIB) for each running thread. The check server checks TIB for flags that identify running threads of debugging tools in protection ring 3 (applications), such as Microsoft Visual Studio and OllyDbg. The check server also detects some debugging tools that run in protection ring 0 (kernel) by their driver names, file names, and sever names. For example, the check server attempts to create the same object handles with the same driver, file, and server names as the debugging tools. If the creation fails, then the debugging tools are present. When there is debugging tool attacking software video player 200, the check server closes the player to prevent it from been hacked.

In addition to the check server, a start server is provided to protect the check server from being attacked. The start server double checks the check server and the player are running without being debugged. Specifically, the start server determines whether or not the check server exists. Since the check server is a program of the Windows operating system, the start server looks for the processes of the check server using the Windows API. If the start server cannot find the processes of the check server, it restarts the check server again to protect the player.

In step 1006, monitor process 314 determines if software video player 300 is under conditions that indicate software video player 300 is being debugged. This function is represented by reference numeral 318 (FIG. 3) in monitor process 314. On Microsoft Windows platforms, an application is generally a child process of Windows Explorer. Thus, monitor process 314 determines if the parent process of software video player 300 is Windows Explorer. If not, then monitor process 314 assumes software video player 300 is being debugged and step 1006 is followed by step 1010. Otherwise step 1006 is followed by step 1008.

In step 1008, monitor process 314 waits for a timeout and then returns to step 1002 to again loop through method 1000.

In step 1010, monitor process 314 applies debugging countermeasures. This function is represented by reference numeral 320 (FIG. 3) in monitor process 314. Debugging countermeasures include forcibly terminating software video player 300 and writing random data into process memory of player 300.

To thwart any attempt to disable monitor process 314, application layer 310 and BDMV engine 308 both periodically detect monitor process 314 after software video player 300 is started. If either application layer 310 or BDMV engine 308 cannot detect monitor process 314, it can forcibly terminate player 300 as a precaution against debugging.

Various other adaptations and combinations of features of the embodiments disclosed are within the scope of the invention. Numerous embodiments are encompassed by the following claims.

The invention claimed is:

1. A method for protecting a software video player having Advanced Access Content System (AACS), comprising:
newly creating, by a processor, a temporary random key each time the software video player is started;
encrypting, by the processor, a fixed random key with the temporary random key to form an encrypted fixed random key;
dividing, by the processor, the encrypted fixed random key into the segments;
storing, by the processor, the segments at noncontiguous regions of a main memory of the processor;
reading, by the processor, the segments from the noncontiguous regions of the main memory;
assembling, by the processor, the segments to form the encrypted fixed random key;
decrypting, by the processor, the encrypted fixed random key with the temporary random key to form the fixed random key;
extracting, by the processor, AACS key data from a pack file;
decrypting, by the processor, the AACS key data with the fixed random key to retrieve AACS Device Keys;
generating, by the processor, an AACS Title Key using the AACS Device Key;
clearing, by the processor, the AACS Device Keys and the fixed random key from the main memory after the AACS Title Key is generated and before removal of an instance of media from which encrypted AACS content are retrieved;
decrypting, by the processor, the encrypted AACS content with the AACS Title Key to form AACS content; and
displaying the AACS content.

2. The method of claim 1, wherein said reading, said assembling, said decrypting the encrypted fixed random key, said extracting, said decrypting the AACS key data, said generating, said clearing, and said decrypting the encrypted AACS content occur dynamically only when the AACS content must be displayed.

3. The method of claim 1, wherein said decrypting the AACS key data further comprising retrieving AACS Host Key, the method further comprising:
authenticating an optical disk drive using the AACS Host Key; and
reading the encrypted AACS content from the optical disk drive.

4. The method of claim 1, further comprising:
generating a random number at a first module of the software video player;
transmitting the random number from a first module to a second module of the software video player;
encrypting the random number with a predefined key at the second module to form an encrypted random number;
transmitting the encrypted random number from the second module to the first module;
decrypting the encrypted random number with the predefined key at the first module; and
verifying the random number at the first module, wherein the second module is authenticated with the first module when the random number has not changed.

5. The method of claim 4, wherein the first and the second modules are selected from the group consisting of a BDMV engine, a codec engine, and an application layer.

6. The method of claim 5, wherein said displaying the AACS content comprising transmitting the AACS content from the BDMV engine to the codec engine, the codec engine converting the AACS content into a video.

7. The method of claim 4, further comprising:
creating a random number key at the first module;
transmitting the random number key from the first module to the second module;
encrypting AACS content with the random number key at the first module;
transmitting the encrypted AACS content from the first module to the second module; and
decrypting the encrypted AACS content with the random number key at the second module.

8. The method of claim 1, further comprising:
   terminating the software video player after detecting a debugger; and
   terminating the software video player after detecting the software video player is under a debugging condition.

9. The method of claim 8, wherein said detecting a debugger comprises checking a thread information block (TIB) for flags that identify a running thread of a debugging tool.

10. The method of claim 8, wherein said detecting a debugger comprises creating object handles with driver, file, and server names of the debugger, wherein the debugger is detected when said creating fails.

11. The method of claim 8, wherein said detecting the software video player is under a debugging condition comprises determining if a title of a parent process of the software video player matches a title of a known program, the software video player being under the debugging condition when the title of the parent process does not match the title of the known program.

12. The method of claim 1, further comprising executing junk codes to obfuscate other steps being performed by the software video player.

13. The method of claim 1, further comprising:
   after decrypting the encrypted AACS content, encrypting the AACS Title Key with a random number; and
   decrypting the encrypted AACS Title Key only when it is used again to decrypt the encrypted AACS content.

14. A non-transitory computer-readable storage medium encoded with executable instructions for execution by a processor to protect a software video player having Advanced Access Content System (AACS), the instructions comprising:
   newly creating a temporary random key each time the software video player is started;
   encrypting a fixed random key with the temporary random key to form an encrypted fixed random key;
   dividing the encrypted fixed random key into the segments;
   storing the segments at noncontiguous regions of a main memory of the processor;
   reading the segments from the noncontiguous regions of the main memory;
   assembling the segments to form the encrypted fixed random key;
   decrypting the encrypted fixed random key with the temporary random key to form the fixed random key;
   extracting AACS key data from a pack file;
   decrypting the AACS key data with the fixed random key to retrieve AACS Device Keys;
   generating an AACS Title Key using the AACS Device Key;
   clearing the AACS Device Keys and the fixed random key from the main memory after the AACS Title Key is generated and before removal of an instance of media from which encrypted AACS content are retrieved;
   decrypting the encrypted AACS content with the AACS Title Key to form AACS content; and
   displaying the AACS content.

15. The non-transitory computer-readable storage medium of claim 14, wherein said reading, said assembling, said decrypting the encrypted fixed random key, said extracting, said decrypting the AACS key data, said generating, said clearing, and said decrypting the encrypted AACS content occur dynamically only when the AACS content must be displayed.

16. The non-transitory computer-readable storage medium of claim 14, wherein said decrypting the AACS key data further comprising retrieving AACS Host Key, the instructions further comprising:
   authenticating an optical disk drive using the AACS Host Key; and
   reading the encrypted AACS content from the optical disk drive.

17. The non-transitory computer-readable storage medium of claim 14, wherein the instructions further comprise:
   generating a random number at a first module of the software video player;
   transmitting the random number from a first module to a second module of the software video player;
   encrypting the random number with a predefined key at the second module to form an encrypted random number;
   transmitting the encrypted random number from the second module to the first module;
   decrypting the encrypted random number with the predefined key at the first module; and
   verifying the random number at the first module, wherein the second module is authenticated with the first module when the random number has not changed.

18. The non-transitory computer-readable storage medium of claim 17, wherein the first and the second modules are selected from the group consisting of a BDMV engine, a codec engine, and an application layer.

19. The non-transitory computer-readable storage medium of claim 18, wherein said displaying the AACS content comprising transmitting the AACS content from the BDMV engine to the codec engine, the codec engine converting the AACS content into a video.

20. The non-transitory computer-readable storage medium of claim 17, wherein the instructions further comprise:
   creating a random number key at the first module;
   transmitting the random number key from the first module to the second module;
   encrypting AACS content with the random number key at the first module;
   transmitting the encrypted AACS content from the first module to the second module; and
   decrypting the encrypted AACS content with the random number key at the second module.

21. The non-transitory computer-readable storage medium of 14, wherein the instructions further comprise:
   terminating the software video player after detecting a debugger; and
   terminating the software video player after detecting the software video player is under a debugging condition.

22. The non-transitory computer-readable storage medium of claim 21, wherein said detecting a debugger comprises checking a thread information block (TIB) for flags that identify a running thread of a debugging tool.

23. The non-transitory computer-readable storage medium of claim 21, wherein said detecting a debugger comprises creating object handles with driver, file, and server names of the debugger, wherein the debugger is detected when said creating fails.

24. The non-transitory computer-readable storage medium of claim 21, wherein said detecting the software video player is under a debugging condition comprises determining if a title of a parent process of the software video player matches a title of a known program, the software video player being under the debugging condition when the title of the parent process does not match the title of the known program.

25. The non-transitory computer-readable storage medium of claim 14, wherein the instructions further comprise executing junk codes to obfuscate other steps being performed by the software video player.

26. The non-transitory computer-readable storage medium of claim 14, wherein the instructions further comprise:
   after decrypting the encrypted AACS content, encrypting the AACS Title Key with a random number; and
   decrypting the encrypted AACS Title Key only when it is used again to decrypt the encrypted AACS content.

* * * * *